Oct. 24, 1961 E. W. GRANT 3,005,956
CURRENT AMPLIFIER FOR LOW IMPEDANCE OUTPUTS
Filed June 26, 1958
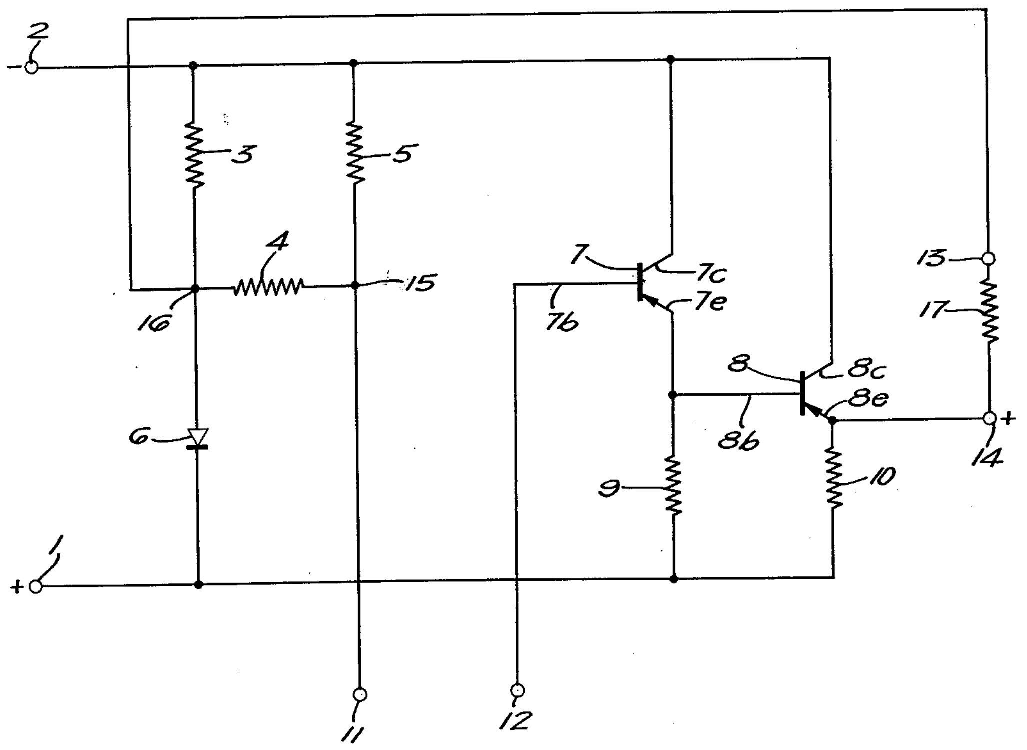
EARL W. GRANT
INVENTOR.
BY
ATTORNEY 3,005,956

CURRENT AMPLIFIER FOR LOW IMPEDANCE OUTPUTS

Earl W. Grant, Los Angeles, Calif., assignor to Statham Instruments, Inc., Los Angeles, Calif., a corporation of California Filed June 26, 1958, Ser. No. 744,760
4 Claims. (Cl. 330—14)

This invention relates to an amplifier which amplifies an input signal to produce an output signal of larger current with no substantial increase in the voltage and with no substantial reduction in the voltage.

I have thus been able to produce an amplifier which will amplify the current of a D.C. or A.C. signal, linearly and without substantial distortion of the input signal and with substantially no change in the voltage amplitude and which has a high gain in the current amplitude; i.e., that is, the current amplifier is one with a low impedance output.

The system of my invention employs an impedance bridge, including in one leg of the bridge a diode operating in the zener region, and in the opposite leg of the bridge a transistor, connected as an emitter follower, i.e., as an impedance reducing stage rather than as a voltage amplifying stage. The other legs of the bridge may be resistances or like load or voltage proportioning elements.

When such a bridge is balanced no signal appears at the output of the bridge. However, when the bridge is unbalanced by the imposition of a signal to the base of the transistor it causes the bridge to be upset and a signal to appear at the output of the bridge. The output voltage will be substantially that of the signal voltage, perhaps somewhat less but not amplified, while the current flow, depending of course on the value of the load resistance and the voltage at the input and impedances in the bridge, will be amplified with a large gain factor.

These and other objects of my invention will be further described in connection with the drawing, in which the figure is a schematic diagram of the current amplifier of my invention.

In the diagram, the D.C. power input is shown as positive pole at 1 and negative at 2. One arm of the impedance bridge is composed of the voltage divider composed of the resistance network formed of resistance 3 shunted by the series resistances 4 and 5. Any other resistance arrangement which will control the bias at 15 may be employed. The adjacent leg of the bridge is formed of the zener diode 6. The diode is of the semiconducting type operated at a potential in the zener region. The two opposite legs of the bridge are composed of transistors 7 and 8 arranged in cascade as emitter followers or impedance reducing stages, in which the emitter resistors 9 and 10 are connected to the emitters *7e* and *8e* of the p.n.p. transistors 7 and 8 respectively, the emitter electrode *7e* being connected to the base *8b*. By proper choice of the resistances 3, 4, 5, 9 and 10 to compensate for the impedance of the diode 6 and transistors 7 and 8, the bridge may be balanced so that no output occurs across the corners of the bridge at the output connections 13 and 14 when no signal is impressed at 11 and 12. In other words, the potential across the zener diode 6 is then equal to that across the emitter resistor 10.

However, if the conductivity of the transistors is modified by applying at 11 and 12 a D.C. signal or a signal having a D.C. component, to the base *7b*, the bridge becomes unbalanced. A signal appears at 13 and 14. If the potential between 11 and 12 is small in comparison with that between 1 and 2, the bridge will be unbalanced by the applied voltage between 15 and *7b* and a similar voltage difference will appear at 13 and 14; however, the current flow will depend on the magnitude of the load 17 connected to the output connections at 13 and 14.

The current impressed, when signal occurs, should flow as indicated by the arrows employing the convention that flow is from positive to negative, remembering that when the diode 6 operated in the zener region the flow of current is in a direction opposite to its polarization at potentials in the region below the zener region.

To illustrate my invention, but without limiting same to the values employed, the following will indicate results obtainable with my invention: employing about 25 volts rectified D.C. input at 1 and 2 and applying 1.18 volts and $25\times10^{-6}$ amps. at 11 and 12, an output of 75 milliamps. is obtained at 13 and 14, with a 15 ohm load at 17 and an output of 40 milliamps. with a 64 ohm load resistor at 17.

The voltage distribution is illustrated by the following example: With 16.5 volts across resistor 5 and 8.5 volts across the diode 6, a voltage of 9.8 volts was obtained across the resistor 9 and 9.3 volts across the resistor 10, at a signal at 11 and 12 of voltage of 1.18 volts and $25\times10^{-6}$ amps. The voltage obtained at the output 13 and 14 across the resistor 17 was 1.02 volts with a current of $72\times10^{-3}$. The high current gain of about 3000 without substantial change in the output voltage is apparent. The potential across 11 and 12 is limited to the current carrying capacity of the transistors and the operating voltage of the zener diode and is in all cases less than that across 1 and 2.

Instead of using p.n.p. transistors I may use equivalent solid state valves as, for instance, p.n.p. transistors by suitable arrangement of polarities.

While I have described a particular embodiment of my invention for the purpose of illustration, it should be understood that various modifications and adaptations thereof may be made within the spirit of the invention as set forth in the appended claims.

I claim:

1. A current amplifier comprising a four-legged electrical bridge, one leg of said bridge containing a resistance, a diode in another leg of the bridge adjacent said first named leg containing said resistance and in series with said first-mentioned leg to form a junction therewith, a power input terminal electrically connected to the end of said resistance remote from said junction, another power input terminal electrically connected to the end of said diode remote from said junction, the remaining legs of said bridge including a transistor and emitter resistance in series with the emitter of said transistor, the collector electrode of said transistor coupled to one power input terminal through an emitter resistance, a signal input terminal electrically connected between said first mentioned resistance and said diode, another signal input terminal electrically connected to the base of said transistor, an output terminal electrically connected to said emitter and another output terminal electrically connected to and between said first mentioned resistance and said diode, said bridge being substantially balanced with substantially no signal at said output when substantially no signal at said input, when the voltage drop across said diode is substantially equal to the voltage drop across the resistance connected to said emitter electrode.

2. In the device of claim 1, a second transistor connected in cascade to the first mentioned transistor, the emitter of said first named transistor connected to the base electrode of said second named transistor, and the collector electrodes of said second named transistor and the collector of said first-named transistor coupled to one power terminal, the emitter electrode of said second named transistor connected to the other power input through an emitter resistance.

3. In the device of claim 2, said resistance leg connected to said diode being a voltage dividing resistance network.

4. In the device of claim 1, said resistance leg connected to said diode being a voltage dividing resistance network.

References Cited in the file of this patent

UNITED STATES PATENTS

| | | |
|---|---|---|
| 2,714,702 | Shockley | Aug. 2, 1955 |
| 2,751,550 | Chase | June 19, 1956 |
| 2,903,522 | Flowers | Sept. 8, 1959 |